United States Patent [19]

Munsch

[11] Patent Number: 5,188,212

[45] Date of Patent: Feb. 23, 1993

[54] ROTATING TRANSPORT APPARATUS

[75] Inventor: Klaus Munsch, Neuwied, Fed. Rep. of Germany

[73] Assignee: Winkler & Dunnebier Maschinenfabrik und Eisengiesserei KG, Neuwied, Fed. Rep. of Germany

[21] Appl. No.: 868,628

[22] Filed: Apr. 14, 1992

[30] Foreign Application Priority Data

May 27, 1991 [DE] Fed. Rep. of Germany ....... 4117296

[51] Int. Cl.$^5$ ............................................. B65G 47/26
[52] U.S. Cl. .................................. 198/457; 198/471.1; 198/475.1; 198/377
[58] Field of Search ................ 198/471.1, 474.1, 475.1, 198/457, 472.1, 469.1, 473.1, 377, 470.1, 803.11

[56] References Cited

U.S. PATENT DOCUMENTS

| | | | |
|---|---|---|---|
| 2,612,254 | 9/1952 | Carter | 198/470.1 |
| 3,941,233 | 3/1976 | Aiuola et al. | 198/471.1 |
| 4,722,432 | 2/1988 | Staton | 198/471.1 |
| 4,974,716 | 12/1990 | Yuri et al. | 198/471.1 X |
| 5,082,105 | 1/1992 | Tincati | 198/473.1 |

Primary Examiner—Robert P. Olszewski
Assistant Examiner—Cheryl L. Gastineau
Attorney, Agent, or Firm—Collard & Roe

[57] ABSTRACT

The invention relates to a rotating transport apparatus for transporting objects from a first conveyor to a second conveyor, each conveyor having a longitudinal extending central axis. The apparatus includes a swivel arm with an axis, and a rotary plate rotatably mounted on the swivel arm axis, extending at least partially to the first and second conveyors. A drive is provided for rotating the rotary plate. Carriers are rotatably mounted beneath the rotary plate, in regular intervals along the periphery of the rotary plate. The carriers have gripper and a carrier axis for counter rotation for consecutively gripping the object, conveyed by the first conveyor. The objects are transported to a second conveyor, and placed on the second conveyor without altering the orientation of the object with respect to the first conveyor. The operating radius between the center of the rotary plate and the carriers is variable.

11 Claims, 4 Drawing Sheets

ROTATING TRANSPORT APPARATUS

BACKGROUND OF THE INVENTION

1. Field of the Invention

The present invention relates to an apparatus for transporting objects from one location to another. More particularly, the invention relates to a rotating transport apparatus for transporting flat and rectangular objects, from a first input conveyor to a second output conveyor. The rotating transport apparatus has a rotary plate, which extends at least partially over the first and second conveyors. Carriers are mounted beneath the rotary plate in regular intervals along the periphery of the rotary plate. The carriers consecutively grip the objects conveyed by the first input conveyor, transport the objects and place the objects on the second output conveyor, with or without altering the orientation of the objects with respect to the first conveyor.

2. The Prior Art

Devices are known for transporting objects from a first conveyor to a second conveyor, where the conveyors are oriented at an angle of 90 degrees to each other. Such devices, for example, are located downstream of machines which manufacture sanitary napkins. These devices, for example, transport the objects from the manufacturing machine to the often-trailing packing machine. In the past, it was customary to have the sanitary napkins run against an impact buffer to bring them to a standstill. The sanitary napkins were then accelerated in the new direction. This method results in delays, and subjects the objects to high acceleration forces, if fast running machines are utilized. This can lead to permanent deformation of the sanitary napkins. Therefore it is desirable to reduce the acceleration forces experienced by the objects.

An arrangement is known for the production of towels which are layered on top of each other, for example, paper towels, consisting of several clamping claws which rotate around a common point of rotation. The clamping claws are attached to and guided by levers along a curved track to perform oppositely directed rotary movement. Although the hand towels are being deflected by 90 degrees, the orientation of their longitudinal axis is not altered.

When producing and processing these towel layers, certain standards relating to towels are utilized. Therefore, this known arrangement is only applicable for a certain working speed. In contrast, sanitary napkins are produced by different standards. It is desirable to have an apparatus which is capable of processing singly packed, folded sanitary napkins. This broad range of functions results in great deviations in the reciprocal intervals and in the feeding speed of the sanitary napkins. The proposed apparatus should receive the sanitary napkins from an input conveyor as smoothly as possible, i.e. without acceleration or hesitation, transport them in an arc and surrender them to an output conveyor.

SUMMARY OF THE INVENTION

It is therefore an object of the present invention to overcome the drawbacks of the prior art, and to provide an apparatus for smoothly transporting objects, such as flat or rectangular objects, from a first conveyor to a second conveyor.

It is a further object of the present invention to provide an apparatus which has a broad range of adjustments in the speed of operation.

It is still a further object of the present invention, to provide an apparatus which can control the orientation of objects as they are moved from the first conveyor to the second conveyor.

These and other related objects are achieved by a rotating transport apparatus for transporting objects from a first conveyor to a second conveyor, each conveyor having a longitudinally extending central axis. The apparatus includes a swivel arm with an axis and a rotary plate, rotatably mounted on the swivel arm axis, which extends at least partially over the first and second conveyors. Drive means are provided for rotating the rotary plate. A plurality of carriers are rotatably mounted beneath the rotary plate in regular intervals along the periphery of the rotary plate. The carriers are equipped with gripping means and counter rotation means for consecutively gripping the objects conveyed by the first conveyor, transporting the objects and placing the objects on the second conveyor. In a first embodiment, the objects are transported from one conveyor to the other, without altering their orientation with respect to the first conveyor.

The prior art problem, which is solved by the present invention is based upon having the operating radius between the center of the rotary plate and each of the plurality of carriers as being variable.

The position of the swivel arm axis along a line which bisects the angle formed by the central axes of the conveyors, is changeable. The swivel arm axis, furthermore, is movable and/or swingable along the line which bisects the angle formed by the central axes of the conveyors. The axes of the conveyor are preferably oriented 90 degrees from each other.

The rotary plate includes a plurality of straight grooves, each of which extends from a point at the periphery of the rotary plate in a straight line towards the center of the rotary plate. The plurality of carriers are slidably mounted within the plurality of straight grooves. The apparatus further includes at least one cover disk concentrically and rotatably mounted on the rotary plate, having a plurality of spiral grooves. Each of these spiral grooves extends from a point at the periphery of the cover disk in a spiral path generally towards the center of the cover disk. The straight grooves and spiral grooves intersect in the area of the carriers, whereas rotation of the cover disk, with respect to the rotary plate, alters the intersection of the grooves and slides, the carriers along the straight grooves to vary the operating radius. Varying the operating radius, alters the linear speed of the carriers so that the linear speed can be matched to the speed of the first conveyor. The gripping means include variable suction means for gripping, transporting and placing the objects.

In a second embodiment of the rotating transport apparatus, the objects are transported from a first conveyor to a second conveyor, without the presence of counter-rotation means. Thus, the objects are rotated 90 degrees with the respect to the first conveyor, as they are transported between the conveyors.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
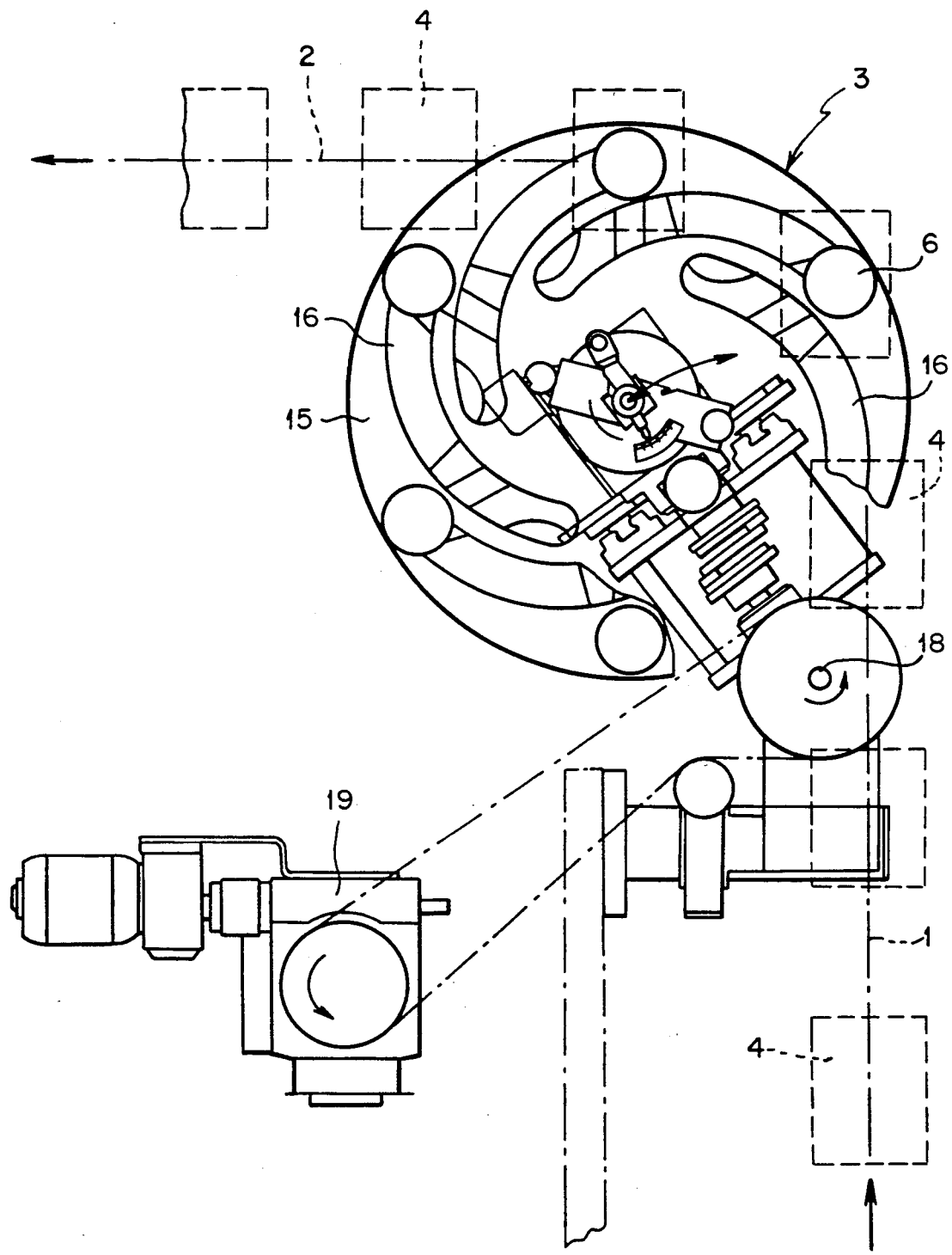
FIG. 1 is a top plan view of a rotating transport apparatus according to the invention.

Referring now to the drawings and particular FIG. 1, there is shown a rotating transport apparatus with a rotating or rotary plate 3, arranged between an input conveyor 1 and an output conveyor 2. More specifically, rotating plate 3 is located at the end of input conveyor 1 and at the beginning of output conveyor 2. Input conveyor 1 is oriented at 90 degrees from output conveyor 2. The rotating transport apparatus moves items from input conveyor 1, for example, sanitary napkins 4, to output conveyor 2.

Figure 4:
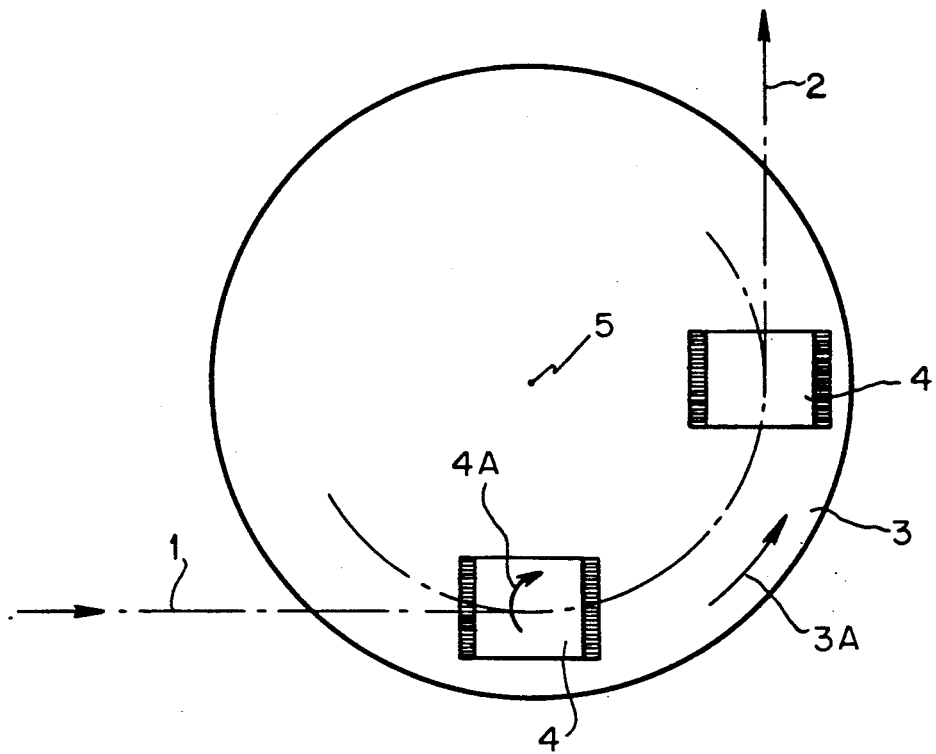
FIG. 4 is a schematic top plan view of the rotary plate of the apparatus.
Figure 5:
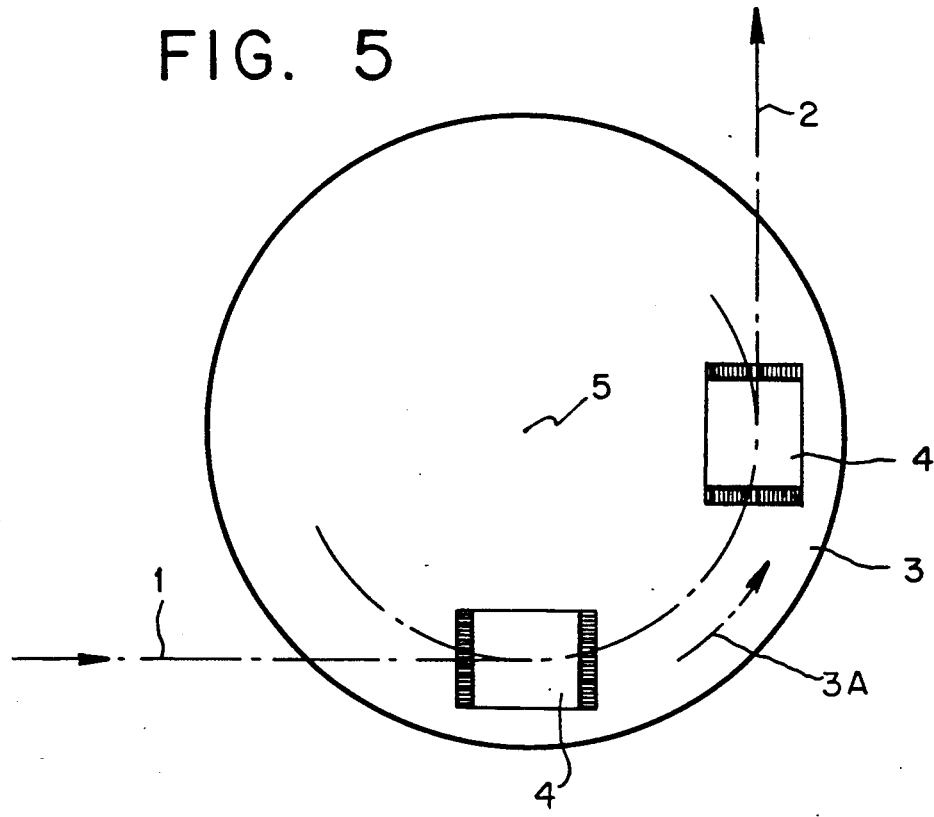
FIG. 5 is a schematic top plan view of a second embodiment of the rotary plate.

As can be seen in FIGS. 4 and 5, sanitary napkins 4 arrive on input conveyor 1, with their longitudinal axis aligned with the axis of input conveyor 1. As shown in FIG. 4, sanitary napkins 4 are transported to output conveyor 2 with the longitudinal axis of sanitary napkins 4, aligned perpendicular to the axis of output conveyor 2. Alternatively, as shown in FIG. 5, sanitary napkins 4 are transported to output conveyor 2, with their longitudinal axis aligned with the axis of output conveyor 2. In the embodiment, according to FIG. 4, sanitary napkins 4 are rotated back against the direction of rotation of rotary plate 3, as it is being transported from input conveyor 1 to output conveyor 2. Arrow 4a shows a 90° clockwise rotation of sanitary napkin 4, as rotary plate 3 rotates 90° counter-clockwise in the direction of arrow 3a. In the embodiment of FIG. 5, sanitary napkin 4 is rotated 90° counter-clockwise in direction 3a without a compensating counter-rotation.

Figure 2:
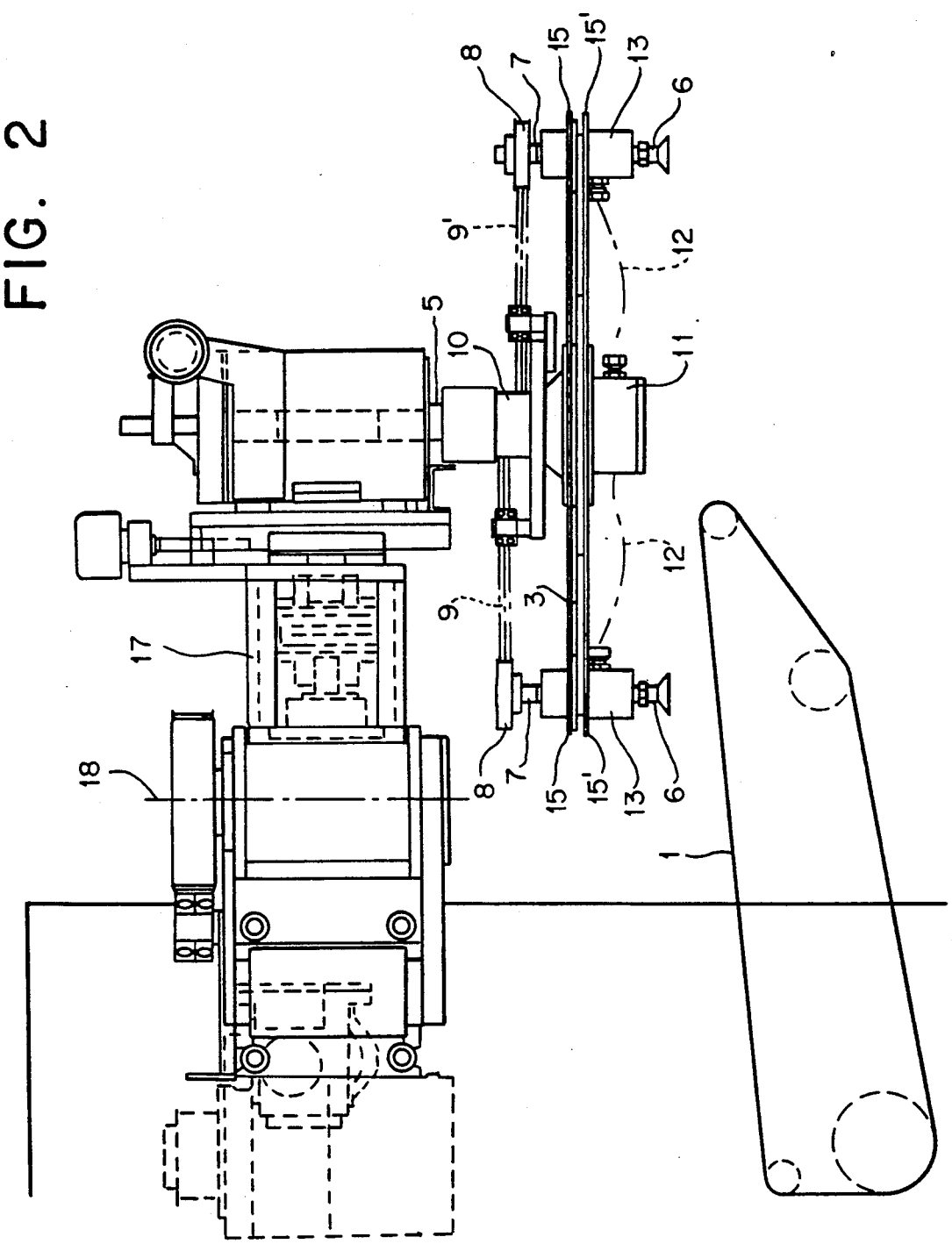
FIG. 2 is a side elevational view of the apparatus according to FIG. 1.

As can be seen in FIG. 2, rotary plate 3 is mounted on turning axis 5. Rotary plate 3 has carriers 6, distributed evenly around its circumference, which are also rotatable about an axis 7. Carriers 6 make one complete clockwise rotation for each complete counter-clockwise rotation of rotary plate 3. Thus, carriers 6 always face the same direction, relative to conveyors 1 and 2. A ratchet wheel 8 is fixably mounted on each axis 7. A standing ratchet wheel 10 is located in the center of rotary blade 3 and functions as a sun-wheel, i.e., is fixed relative to conveyors 1 and 2. One or more toothed belts 9 and 9' connect ratchet wheels 8 to standing ratchet wheel 10. As rotary plate 3 spins in the counter-clockwise direction, standing ratchet wheel 10 and belts 9, 9' rotate ratchet wheels 8, and carriers 6 in the clockwise direction. Thus, carriers 6 always face the same direction relative to conveyors 1 and 2. The number of teeth in standing ratchet wheel 10 is the same as the number of teeth on ratchet wheel 8. Each counter-clockwise rotation of rotary plate 3 causes a complete clockwise revolution of carrier 6.

In a preferred embodiment of the invention carriers 6 are combined in groups, each group being propelled by a single toothed belt. For example, toothed belt 9 may operate three carriers on one half of the rotary plate 3, and toothed belt 9' may operate the remaining three carriers on the other side of rotary plate 3. Combining carriers 6 into groups reduces cost and reduces slippage of the toothed belt.

Carriers 6 are formed as vacuum devices with the vacuum being supplied by control head 11, arranged in the center of rotary plate 3. Lines 12 connect control head 11 to the suction devices on carriers 6.

Figure 3:
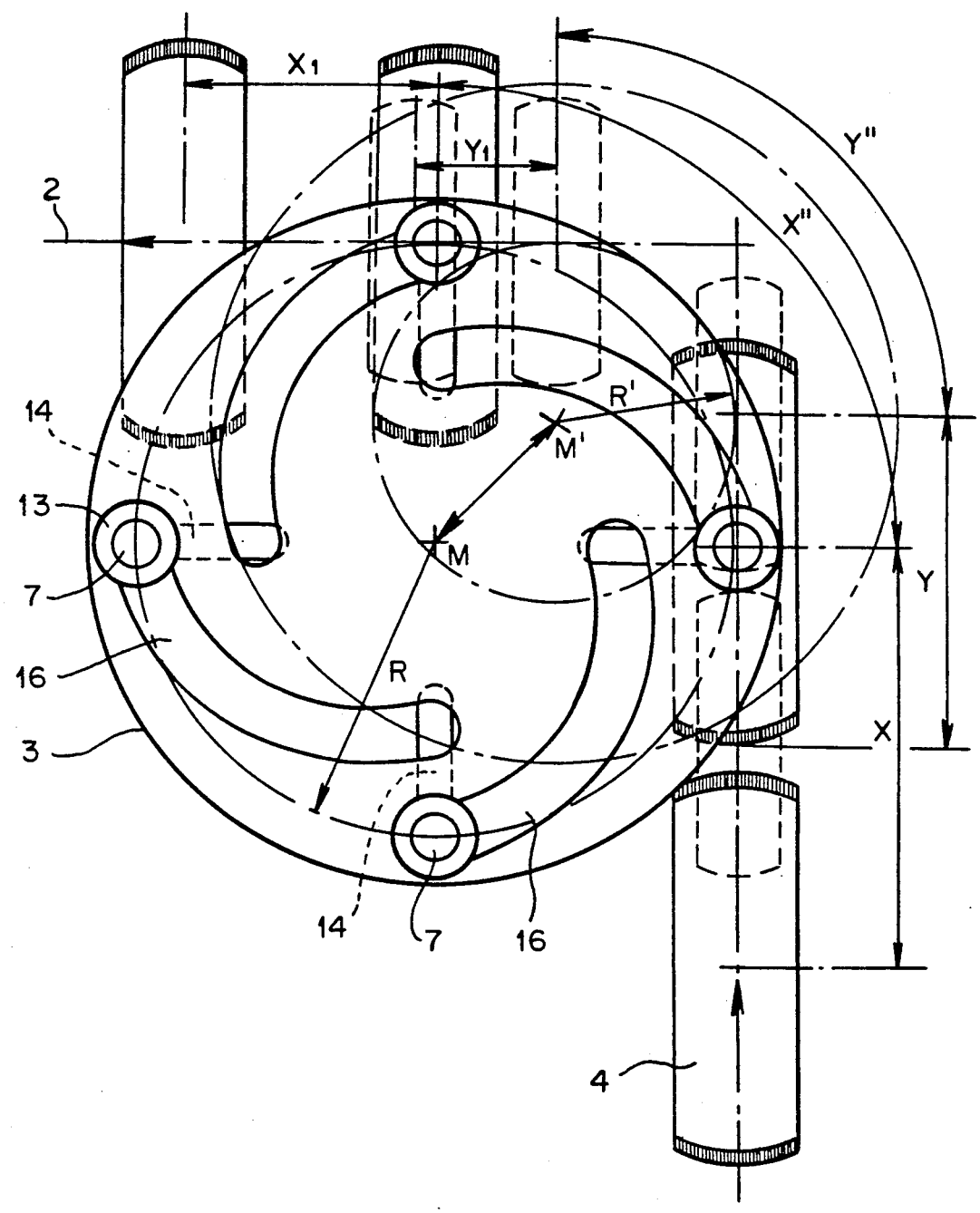
FIG. 3 is a top plan view showing the range of settings of the device.

As can be seen in FIG. 3, rotary plate 3 has straight grooves 14 which extend from a point near the periphery of rotary plate 3 in a straight line, towards the center of rotary plate 3. As seen in FIG. 1, cover disks 15 and 15' have matching spiral grooves 16, which extend from a point near the periphery of disks 15, 15', along a spiral course generally towards the center of disks 15, 15'. Straight grooves 14 and spiral grooves 16 are structured so that they may overlap or intersect to provide a clear passage through rotary plate 3 and disks 15, 15'. Referring to FIG. 3, axis 7 of carriers 6 are rotatably mounted within housings 13, which are placed at the intersection of straight grooves 14 and spiral grooves 16. Housings 13 are shown near the periphery of rotary plate 3 within both straight grooves 14 and spiral grooves 16. If disks 15, 15' are rotated with respect to rotary plate 3, for example, in the clockwise direction, housings 13, axis 7 and carriers 6 would be guided along straight grooves 14 towards the center of rotary plate 3. In this manner, the operating radius R of carriers 6, may be altered.

FIG. 3 shows rotary plate 3 with the largest possible operating radius R. The smallest possible operating radius R' is also indicated, however, it originates from a central point M', displaced with respect to central point M. As the operating radius decreases, central point M must be moved forward to central point M', so that carriers 6 remain centered above both conveyors 1 and 2. All central points between M and M' lie on the angle bisector of the right angle, which is defined by the longitudinal axes of conveyors 1 and 2. Movement of the central point between M and M' allows carriers 6 to lie above the central axis of the conveyors, independent from the operating radius.

As seen in FIG. 2, rotary plate can be moved from central point M to M' by swivel arm 17, which has turning axis 5 mounted on one end thereof. As can be seen in FIGS. 1 and 2, swivel arm 17 pivots around an axis 18. Although motion around axis 18 is arcuate, and not exactly straight, the deviation from line M-M' as shown in FIG. 3 is so small, that the operation of the device is not affected The minor phase displacement between rotary plate 3 and input conveyor 1 can be compensated for by engagement of a differential gear 19, as seen in FIG. 1, located in the drive train of rotary plate 3.

The device can be adjusted to a new setting as follows. The speed at which sanitary napkins 4 will be processed is generally based on the number of carriers 6, which are arranged on rotary plate 3. For example, if rotary plate 3 operates at a set speed, of one rotation per second utilizing four carriers, it will result in four sanitary napkins transferred per second, whereas the use of six carriers would result in six sanitary napkins being transferred per second.

Next, operating radius R is adjusted so that the speed of rotation or linear speed of carriers 6 is identical with the speed of input conveyor 1. For example, if rotary plate 3 rotates at a fixed speed, the linear speed of carriers 6 can be adjusted based on their distance from central point M. If carrier 6 is closer to central point M, it will have a slower linear speed than if carriers 6 are farther from central point M, i.e. towards the periphery of rotary plate 3. As can be seen in FIG. 2, swivel arm 17 is then adjusted, so that carriers 6 lie directly above the central axis of sanitary napkins 4, arriving on input conveyor 1. Finally, differential gear 19 is adjusted, so that the phase of rotary plate 3 matches that of input conveyor 1, so that carriers 6 grasp the middle of sanitary napkins 4.

As can be seen in FIG. 2, input conveyor 1 slopes upward in the vicinity of rotary plate 3. As the sanitary napkins approach carrier 6, the vacuum at carrier 6 grasps sanitary napkins 4 at a speed of several hundred per minute. Sanitary napkins 4 are then deposited onto output conveyor 2, without undergoing a change in their speed. As sanitary napkins 4 are transferred from input conveyor 1 to output conveyor 2, they are rotated in the opposite direction of rotation of rotary plate 3, as described earlier. In this manner, sanitary napkins 4 retain their original orientation as they are moved to output conveyor 2. The speed of output conveyor 2 can be freely chosen from a wide range of speeds.

For the most part, the speed of output conveyor 2 is slower than the speed of input conveyor 1, whereby a smaller distance between the center lines of sanitary napkins 4 is achieved on output conveyor 2. As can be seen in FIG. 3, the sanitary napkins 4 on output conveyor 2, are aligned transverse to each other, and have a closer spacing than on input conveyor 1. This configuration is advantageous, for example, for a packing machine, which follows output conveyor 2. Distance X and distance Y denote the largest and smallest distances between the center points of sanitary napkins 4, as they arrive on input conveyor 1. X" and Y" refer to the arcs which correspond to operating radius R and R', respectively. Distance X1 and Y1 refers to the range of distances between center points of adjacent sanitary napkins 4 on output conveyor 2.

Sanitary napkins 4 arrive on conveyor 1, having a distance between center points X, they then travel along arc X" and are deposited on output conveyor 2, having a distance X1 between respective center points. Similarly, sanitary napkins 4, which arrive on input conveyor 1 having a distance between center points Y, travel along arc Y" and have a distance Y1 between their center points on output conveyor 2. As noted earlier, the linear speed of carriers 6 is the same as the speed of input conveyor 1, i.e. the distance between the center points of sanitary napkins 4 is not affected by carriers 6. However, since output conveyor 2 runs slower than input conveyor 1, the distance X1 or Y1 between center points is changed and is smaller than the distance X or Y between center points.

The number of rotation of carriers 6 relative to rotary plate 3 can be freely chosen by selecting a different number of teeth on ratchet wheels 8 and 10. It is also possible to reverse the direction of rotation of carrier 6, by reversing the direction belts 9 and 9'. For example, in FIGS. 3 and 4, carriers 6 rotate sanitary napkins 4, 90 degrees clockwise, as rotary plate 3 rotates them 90 degrees counter-clockwise. These two opposite 90 degree rotations compensate for each other so that sanitary napkins 4 maintain the same orientation with respect to conveyors 1 and 2. It is also possible to have objects arrive on input conveyor 1, with their longitudinal axis aligned with the longitudinal axis of input conveyor 1, and have them depart with their longitudinal axis aligned with the longitudinal axis of output conveyor 2 as shown in FIG. 5. This arrangement is suitable for the simple rerouting of objects. This can be accomplished by interrupting the drive of carrier 6, or by having ratchet wheel 10 rotate along with rotary plate 3.

While several embodiments of the present invention have been shown and described, it is to be understood that many changes and modifications may be made thereunto without departing from the spirit and scope of the invention as defined in the appended claims.

What is claimed is:

1. A rotating transport apparatus for transporting objects from a first conveyor to a second conveyor, each conveyor having a longitudinally extending central axis, comprising:
    a swivel arm with an axis;
    a rotary plate rotatably mounted on said swivel arm axis and extending at least partially over the first and second conveyors;
    drive means for rotating said rotary plate; and
    a plurality of carriers rotatably mounted beneath said rotary plate in regular intervals along the periphery of said rotary plate, said plurality of carriers having gripping means and counter-rotation means for consecutively gripping the objects conveyed by the first conveyor, transporting the objects and placing the objects on the second conveyor without altering the orientation of the object with respect to the first conveyor, wherein the operating radius between the center of said rotary plate and each of said plurality of carriers is variable.

2. The rotating transport apparatus according to claim 1, wherein the position of said swivel arm axis along a line which bisects the angle formed by the central axes of the conveyors is changeable.

3. The rotating transport apparatus according to claim 2, wherein said swivel arm axis is movable along the line which bisects the angle formed by the central axes of the conveyors.

4. The rotating transport apparatus according to claim 2, wherein said swivel arm axis is swingable along the line which bisects the angle formed by the central axes of the conveyors.

5. The rotating transport apparatus according to claim 2, wherein the axes of the conveyors are oriented 90 degrees from each other.

6. The rotating transport apparatus according to claim 1, wherein said rotary plate includes a plurality of straight grooves, each of which extends from a point at the periphery of said rotary plate in a straight line towards the center of said rotary plate, wherein said plurality of carriers are slidably mounted within the plurality of grooves.

7. The rotating transport apparatus according to claim 6, additionally comprising at least one cover disk, concentrically and rotatably mounted on said rotary plate, having a plurality of spiral grooves, each of which extends from a point at the periphery of said at least one cover disk in a spiral path, generally towards the center of said at least one cover disk, the plurality of straight grooves and spiral grooves intersect in the area of said plurality of carriers, whereas rotation of said at least one cover disk with respect to said rotary plate alters the intersection of the grooves and slides said plurality of carriers along the plurality of straight grooves to vary the operating radius.

8. The rotating transport apparatus according to claim 7, wherein varying the operating radius alters the linear speed of said plurality of carriers, so that the linear speed can be matched to the speed of the first conveyor.

9. The rotating transport apparatus according to claim 1, wherein said gripping means include variable suction means for gripping, tansporting and placing the objects.

10. The rotating transport apparatus according to claim 1, wherein said counter-rotation means include a carrier axis, a ratchet wheel fixably mounted to said carrier axis and a sun wheel mounted on said swivel arm axis, which does not rotate relative to the first conveyor, and a belt which connects said ratchet wheel to said sun wheel, so that as said rotary plate spins in a counter-clockwise direction, said standing wheel, said belt and said ratchet wheels rotate said carriers in a clockwise direction.

11. A rotating transport apparatus for transporting objects from a first conveyor to a second conveyor, each conveyor having a longitudinally extending central axis, comprising:
 a swivel arm with an axis;
 a rotary plate rotatably mounted on said swivel arm axis and extending at least partially over the first and second conveyors;
 drive means for rotating said rotary plate; and
 a plurality of carriers fixably mounted beneath said rotary plate in regular intervals along the periphery of said rotary plate, said plurality of carriers having gripping means for consecutively gripping the objects conveyed by the first conveyor, transporting the objects and placing the objects on the second conveyor, wherein the operating radius between the center of said rotary plate and each of said plurality of carriers is variable.

* * * * *